DANIEL H. HULL.

Improvement in Boiler and Washing Machines.

No. 4,521. Reissued Aug. 22, 1871.

*Witnesses*

C. B. Nottingham.

J. R. Nottingham

*Inventor*

Daniel H. Hull by A. Pollok his attorney

UNITED STATES PATENT OFFICE.

DANIEL H. HULL AND J. B. SAVAGE, OF PLANTSVILLE, CONNECTICUT, ASSIGNEES OF DANIEL H. HULL.

IMPROVEMENT IN BOILERS AND WASHING-MACHINES.

Specification forming part of Letters Patent No. 101,622, dated April 5, 1870; reissue No. 4,521, dated August 22, 1871.

*To all whom it may concern:*

Be it known that I, DANIEL H. HULL, of Plantsville, in the county of Hartford and in the State of Connecticut, have invented certain new and useful Improvements in Combined Boilers and Washing-Machines; and I do hereby declare that the following is a full, clear, and exact description thereof, reference being had to the accompanying drawing making a part of this specification, in which—

Figure 1:
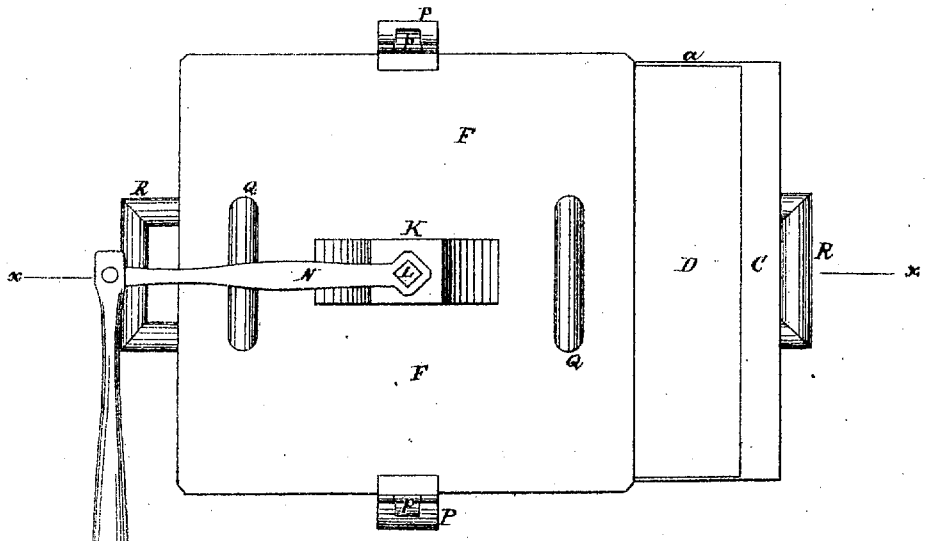
Figure 2:
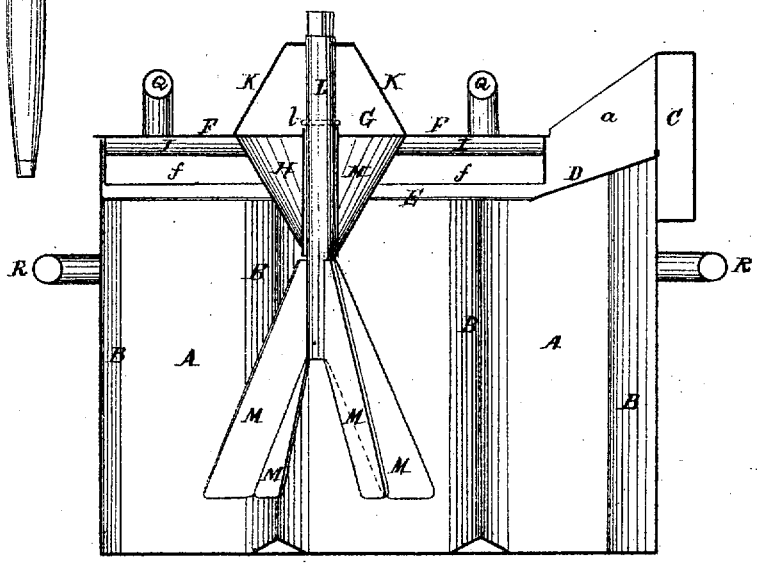

Figure 1 is a plan view of the upper side of my improved device, and Fig. 2 is a vertical central section of the same on the line *x x* of Fig. 1.

Letters of like name and kind refer to like parts in each of the figures.

My invention relates to boilers and washing-machines which are adapted to be placed upon cooking-stoves or ranges after the manner of ordinary wash-boilers; and its main object is to effect the cleansing or washing and the wringing of the clothes in one and the same device, thus avoiding the necessity of taking the clothes out from the boiler, and transferring them to a wringer separate or placed at a distance from the boiler. To this end my invention consists, principally, of a sheet-metal wash-boiler, which, while adapted to be set or placed upon a stove or range like an ordinary wash-boiler, is so constructed as to receive a wringer. It further consists of a boiler and washer provided with means to receive a wringer, in combination with a conduit or trough for catching and returning to the boiler the water squeezed from the clothes passing through the wringer. It consists further of a combined boiler and washing-machine, constructed substantially as hereinafter described, so that all the moving parts of the washing apparatus proper are carried by and removable with the cover of the boiler. It consists further in minor features relating to the construction and arrangement of the several parts of the apparatus.

The manner in which my invention is or may be carried into effect will be readily understood by reference to the annexed drawing, in which I have represented in illustration of my invention a boiler provided with a clothes-washing mechanism of peculiar construction, which I, on some accounts, prefer to use in connection with the boiler, although it is not necessary to use this peculiar mechanism in order to construct the boiler so as to receive the wringer, this latter feature being quite independent of any particular washing mechanism.

In the annexed drawing, A represents a rectangular reservoir, of sheet metal, strengthened upon its sides and bottom by means of a number of ribs, B, of the same material. The sides *a* of the reservoir or boiler are extended upward at one end, and have secured thereto a flat rectangular box, C, of sheet metal, having a sufficient thickness to receive the clamp of a wringer, so as to permit the latter to be attached to the boiler. A sloping shelf or trough, D, extending inward and downward from the box C, connects, at its ends, with a narrow ledge, E, that extends along the sides and across the opposite end of the boiler, the objects of which are to further strengthen the boiler, so as to enable it to withstand the strain caused by the wringer, and also to receive the drippings from the wringer and conduct them back to the boiler, and to prevent the water contained within said boiler from boiling over. Corresponding in size with the top of the boiler A, between its end and the raised portion *a*, is a cover, F, having upon its lower side a flange, *f*, that shuts inside of the walls of said boiler. Secured to and extending downward from the center of the cover F is a tube, G, the lower end of which passes the small end of a cone, H, of sheet metal, the base of said cone being secured to or upon the lower side of said cover, and strengthened by means of four ribs, I, attached to the same and to the cover, and extending outward to each corner of the latter. A brace, K, attached at its ends to the upper side of the cover, and extending upward and across directly above the pipe G, is provided with an opening corresponding in size, shape, and position with the opening through the latter, and, together with said pipe, serves to contain a shaft, L, which, passing downward through the same, is supported and held in position vertically by means of a pin, *l*, passing transversely through said shaft immediately above said pipe. Secured to and extending downward and radially outward from the lower end of the shaft L are four blades or wings, M, which, when said shaft is partially or entirely rotated, cause the clothing to change its position in the same, so as to bring every portion of said clothing in contact with the boiling water. In order that the shaft and blades may be readily operated, a crank, N, secured to or upon its upper end, and a lever, O, pivoted to the end of said crank, are provided, by means of which the operator is enabled to agitate the clothing and water, while at a sufficient distance from the stove, to make the heat endurable. Under this arrangement the washing apparatus is carried by and removable with the cover, so that when the latter is taken off from the boiler the body of the boiler will be free from the washing mechanism. Two hasps, P, hinged to the edges of the cover, and engaging with suitable staples, *p*, attached to the sides of the boiler, hold said cover firmly in place, while two handles, Q, attached to the upper side of said cover, permit its ready removal when desired. Four handles, R, secured upon the ends of the boiler, complete the device, the operation of which is as follows:

The boiler being placed upon the stove, and a suitable quantity of suds being placed within the boiler and caused to boil, the clothing is placed therein, the cover replaced, and said clothing and water thoroughly agitated by means of the shaft and blades, operated as above set forth, when it will be found that in from three to five minutes the dirt will be removed from the fabrics in the most thorough manner, and without the necessity of rubbing, pounding, or other equivalent means. A wringer being now secured to the box or brace C the clothing can be passed through the same as taken from the boiler, and, after rinsing, is ready for the line.

Having now described my invention and the manner in which the same is or may be carried into effect, I shall state my claims, as follows:

1. A sheet-metal wash or clothes-boiler, which, while adapted to be set or placed upon a stove or range like an ordinary wash-boiler, is so constructed as to receive a wringer, substantially as shown and set forth.

2. A sheet-meal wash-boiler, provided with means to receive a wringer, in combination with a trough or conduit for catching and returning to the boiler the water squeezed from the clothes passing through the wringer.

3. A combined clothes-boiler and washing-machine, constructed substantially as herein described, so that all the moving parts of the washing apparatus proper shall be carried by and removable with the cover of the boiler.

4. The combination, in one apparatus, of a sheet-metal clothes-boiler, adapted to be placed upon a stove or range, and used like an ordinary wash-boiler, a washing mechanism and means or devices to receive a wringer, substantially as shown and described.

5. The washing mechanism, constructed and applied to the boiler-cover, substantially as herein shown and set forth.

In testimony whereof I have signed my name before two subscribing witnesses.

DANIEL H. HULL.

Witnesses:
JOHN E. JONES,
P. S. PHINNEY.